United States Patent
Nagaharu et al.

(10) Patent No.: US 6,175,429 B1
(45) Date of Patent: Jan. 16, 2001

(54) DOCUMENT READER AND METHOD FOR ADJUSTING ITS FOCUS

(75) Inventors: Kenichi Nagaharu; Noriyuki Nouda, both of Nagano (JP)

(73) Assignee: Seiko Epson Corporation, Tokyo (JP)

( * ) Notice: Under 35 U.S.C. 154(b), the term of this patent shall be extended for 0 days.

(21) Appl. No.: 09/040,402

(22) Filed: Mar. 18, 1998

(30) Foreign Application Priority Data

| Mar. 18, 1997 | (JP) | 9-065186 |
| Oct. 8, 1997 | (JP) | 9-275683 |

(51) Int. Cl.⁷ .................................................. H04N 1/04
(52) U.S. Cl. ........................... 358/475; 358/488; 358/497
(58) Field of Search ................................... 358/475, 482, 358/483, 446, 497, 406, 504, 513, 514, 486, 488; 250/208.1, 201.7, 201.4, 201.2; 353/101; 352/140; 355/55, 56; 348/345, 349, 96, 97

(56) References Cited

U.S. PATENT DOCUMENTS

| Re. 31,370 | * | 9/1983 | Mashimo et al. | 396/110 |
| 4,464,681 | * | 8/1984 | Jacobs et al. | 358/406 |
| 4,751,376 | * | 6/1988 | Sugiura et al. | 250/208.1 |
| 4,804,831 | * | 2/1989 | Baba et al. | 250/201.2 |
| 4,912,567 | * | 3/1990 | Nakajima et al. | 358/475 |
| 4,922,087 | * | 5/1990 | Nakajima et al. | 250/201.4 |
| 5,394,205 | * | 2/1995 | Ochiai et al. | 353/101 |
| 5,767,989 | * | 6/1998 | Sakaguchi | 358/486 |

FOREIGN PATENT DOCUMENTS

| 35 10 066 | 5/1986 | (DE) | G02B/7/11 |
| 0 456 320 | 11/1991 | (EP) | H04N/5/232 |
| 62-2225 | 1/1987 | (JP) | G02B/7/11 |
| 2-20848 | 1/1990 | (JP) | G03B/27/34 |
| 2-237366 | 9/1990 | (JP) | H04N/1/04 |
| 6-102593 | 4/1994 | (JP) | . |
| 6-319020 | 11/1994 | (JP) | H04N/1/04 |

OTHER PUBLICATIONS

Patent Abstracts of Japan, vol. 011, No. 083 (E–489), Mar. 13, 1987 & JP 61 237565 A (Minolta Camera Co Ltd), Oct. 22, 1986 *Abstract.

Patent Abstracts of Japan, vol. 015, No. 223 (E–1075), Jun. 7, 1991 & JP 03 064248 A (Canon Inc) Mar. 19, 1991 *Abstract.

Patent Abstracts of Japan, vol. 011, No. 081 (E–488) Mar. 12, 1987 & JP 61 236272 A (Minolta Camera Co Ltd) Oct. 21, 1986 *Abstract.

Patent Abstracts of Japan, vol. 012, No. 394 (P–773) Oct. 20, 1988 & JP 63 135910 A (Fuji Photo Film Co Ltd) Jun. 8, 1988 *Abstract.

Patent Abstracts of Japan, vol. 014, No. 489 (E–0994), Oct. 24, 1990 & JP 02 202264 A (Canon Inc) Aug. 10, 1990 *Abstract.

\* cited by examiner

*Primary Examiner*—Cheukfan Lee
(74) *Attorney, Agent, or Firm*—Sughrue, Mion, Zinn, Macpeak & Seas, PLLC

(57) ABSTRACT

A focus adjusting plate 10 serving as a reference for focus adjustment is attached to a glass plane of a document stand 11, and a lens carriage 19 in a reading unit 1 is made movable minutely in a sub-scanning direction. The lens carriage is moved one pitch by one pitch within a minute movement range to read black stripes and white areas of the focus adjusting plate 10. The position of the lens carriage providing a maximum contrast is obtained, and the lens carriage 19 is fixed at the position. Thus, the optical path length L from the upper face of the glass plane of the document stand 11 to the lens 17 via mirrors 14, 15 and 16 is focus-adjusted. Accordingly, errors such as variations in accuracy in fabrication can be canceled to provide an image data in focus.

6 Claims, 10 Drawing Sheets

DOCUMENT READER AND METHOD FOR ADJUSTING ITS FOCUS

BACKGROUND OF THE INVENTION

1. Field of the Invention

The present invention relates to a document reader for optically reading a document to be converted into an electric signal and a method for adjusting its focus.

2. Related Art

A document reader is known which optically reads a color document by an image sensor of a storage-type charge transfer device such as CCD and color-decomposes the document thus read to acquire image data.

FIG. 13 is a schematic diagram of a conventional document reader in a mirror movement system. A document reader, generally 100' includes a reading unit 1 for optically reading a document to be electrically converted into multi-value (or binary) data, a data detecting unit 2 for detecting an output data from said read unit 1, a controlling unit 3 for receiving the detected data from the data detecting unit 2 to produce an image data and controlling the movement of a mirror carriage 12 and mirrors 15, 16 arranged in the reading unit 1, and an interface 4 for outputting the image data. The image data is supplied to an external image data processing unit 6 such as a PC (personal computer) through the interface 4 and a cable 5. Incidentally, in many cases, the controlling unit 3 is configured by an MPU (microprocessor having a CPU, RAM and ROM).

The reading unit 1 includes a document stand 11 on which a document or original is placed, a mirror carriage 12 which is a pair of a light source 13 and a mirror 14 used to scan the document optically; mirrors 15, 16; a light-gathering lens 17, a CCD 18 and a stepping motor 21 for driving the mirror carriage 12 and mirrors 15, 16.

In FIG. 13, assuming that the distance between a face of the document and the mirror 14 is a, that between the mirrors 14 and 15 is b, that between the mirrors 15 and 16 is c, and that between the mirrors 16 and the light-gathering lens 17 is d, and a+b+c+d=L, even when the mirror carriage 12 and mirrors 15, 16 move in a sub-scanning direction (direction of arrow 28) in document reading, the total L of the optical path from the document face to the light-gathering lens 17 is constant.

Specifically, after the mirror carriage 12 and mirrors 15, 16 have moved, the respective distances become a, b' c and d'. In this case, the mirrors 15, 16 move in the sub-scanning direction in synchronism with the movement of the mirror carriage 12 so that a+b'+c+d'=L, and the moving distance of the mirrors 15, 16 is equal to the moving distance of the mirror carriage 12×(½). For example, by setting a gear ratio for 2:1, the moving distance of the mirror is determined. Additionally, the light-gathering lens 17 and CCD 18 remain fixed and does not move in response to the scanning of the document.

As described above, the document reader 100' is designed so that the total L of the optical path is constant. In this case, L commonly contains a permissible error E. If the sum δ of errors is larger than the permissible error E, an adjustment was made in only fabrication so that |δ|≦E.

However, with an improvement of an image processing technique, a high resolution has been demanded for the color document reader so that the range of the permissible error E has been limited. Therefore, it has become difficult to absorb such an error only by techniques in design and fabrication inclusive of an improvement in material and accuracy of a motor of moving the mirrors and others. As a result, the requirement of high accuracy in the document reader has led to necessity of allowing for an increase in the production cost.

For example, in the case of the color document reader, the permissible error of E=2 mm or so has been traditionally required.

At the present time when the resolution has been improved, however, E≦0.5 mm, preferably E≈0 is required.

In the reader in which the document to be read is in contact with the document stand 11, the distance a between the document and mirror 14 has been regarded as constant, thus providing no problem.

On the other hand, in a flat bed type document reader as shown in FIG. 13 in which the document is a negative or positive film, the film, while it is held in a holder as shown in FIG. 5, is scanned.

In this case, a gap h (2–3 mm) due to the thickness of the holder is produced between the film and the document stand 11. This led to a problem of making it more difficult to realize the permissible error E=δ+α≦0.5 mm. If the thickness of the holder is constant, this problem can be solved in hardware. However, in many cases, unfortunately, there was an inconvenience that the thickness of the holder varies according to manufactures and/or kind of the film to be held by the holder.

SUMMARY OF THE INVENTION

The present invention has been accomplished by inventors under an idea that the errors to be generated in manufacturing and transferring and a change in the distance between the document face and document stand (i.e. between the document and mirror 14) can be absorbed by finely adjusting the optical path length L so as to absorb the errors δ+α, thus realizing focus adjustment.

The present invention has been accomplished in order to solve the above inconvenience on the basis of the above idea, and intends to provide a document reader in which the optical path length L is finely adjusted to make the focus adjustment and its focus adjusting method.

The document reader of the present invention includes a light gathering lens for gathering light from a document and an optical sensor for converting light from the light-gathering lens into an electric signal, an optical path length adjusting means capable of adjusting the optical-path length between said document and said light-gathering lens; and a controller for computing an average maximum value and an average minimum value of a luminance signal of each of pixels which are read by said optical sensor and issuing a command to said optical path length adjusting means so that a difference between said average maximum value and said average minimum value is maximum. In such a configuration, the optical path length from the document to the light gathering lens cancel errors such as variations in accuracy in fabrication, thereby providing an image data in focus.

The document reader of the present invention includes a light gathering lens for gathering light from a document and an optical sensor for converting light from the light-gathering lens into an electric signal, an optical path length adjusting means capable of adjusting the optical-path length between said document and said light-gathering lens; and a controller for computing an a difference between luminance signals at adjacent reading positions read by said optical sensor and issuing a command to said optical path length adjusting means so that the absolute value of the difference is maximum. In such a configuration, the optical path length from the document to the light gathering lens cancel errors such as variations in accuracy in fabrication, thereby providing an image data in focus.

The document reader of the present invention comprises a focus adjusting plate attached to a prescribed position of a document stand, and is characterized in that said controller issues a command to said optical path length adjusting means on the basis of a luminance signal of an image for focus adjustment on said focus adjusting plate which is read by said optical sensor. In such a configuration, the optical path length from the document to the light gathering lens cancel errors such as variations in accuracy in fabrication, thereby providing an image data in focus.

The focus adjusting method of the present invention is a focus adjusting method for a document reader which gathers light from a document by a light-gathering lens and converts light from said light-gathering lens into an electric signal, comprising the steps of: (a) adjusting an optical path length between said light-gathering lens and said document; (b) using said optical sensor, reading luminance of each of pixels on said document and converting it into an electric signal; (c) computing an average maximum value and an average minimum value of said electric signal of each said pixel in said step (b); (d) repeating said steps (a), (b) and (c) for a plurality of optical path lengths; (e) acquiring an optical path length when a difference between said average maximum value and said average minimum value is maximum; (f) adjusting the optical path length so that it is the optical path length acquired in said step (e).

The focus adjusting method of the present invention is a focus adjusting method for a document reader which gathers light from a document by a light-gathering lens and converts light from said light-gathering lens into an electric signal, comprising the steps of: (a) adjusting an optical path length between said light-gathering lens and said document; (b) using said optical sensor, reading luminance at each of a plurality of reading positions on said document and converting them into electric signals; (c) computing a difference between magnitudes of said electric signals at adjacent read positions in said step (b); (d) repeating said steps (a), (b) and (c) for a plurality of optical path lengths; (e) acquiring an optical path length when the difference between magnitudes of said electric signals at said adjacent reading positions is maximum; and (f) adjusting the optical path length so that it is the optical path length acquired in said step (e).

The focus adjusting method of the present invention is provided in that a focus adjusting plate is attached to a prescribed position of a document stand, and an image on said focus adjustment is read for focusing.

DETAILED DESCRIPTION OF THE PREFERRED EMBODIMENTS

Figure 1A:
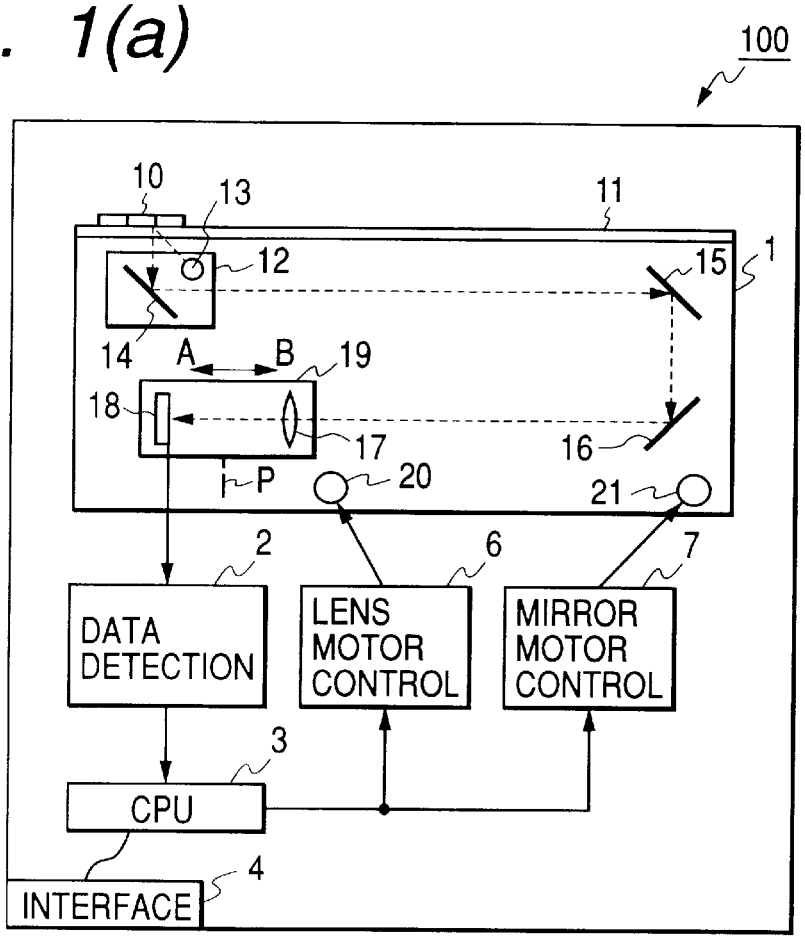
FIGS. 1(a) and 1(b) are views showing an exemplary configuration of the document reader in a mirror movement system according to the present invention.
Figure 1B:
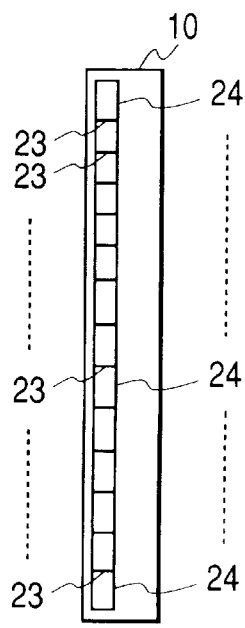
Figure 2A:
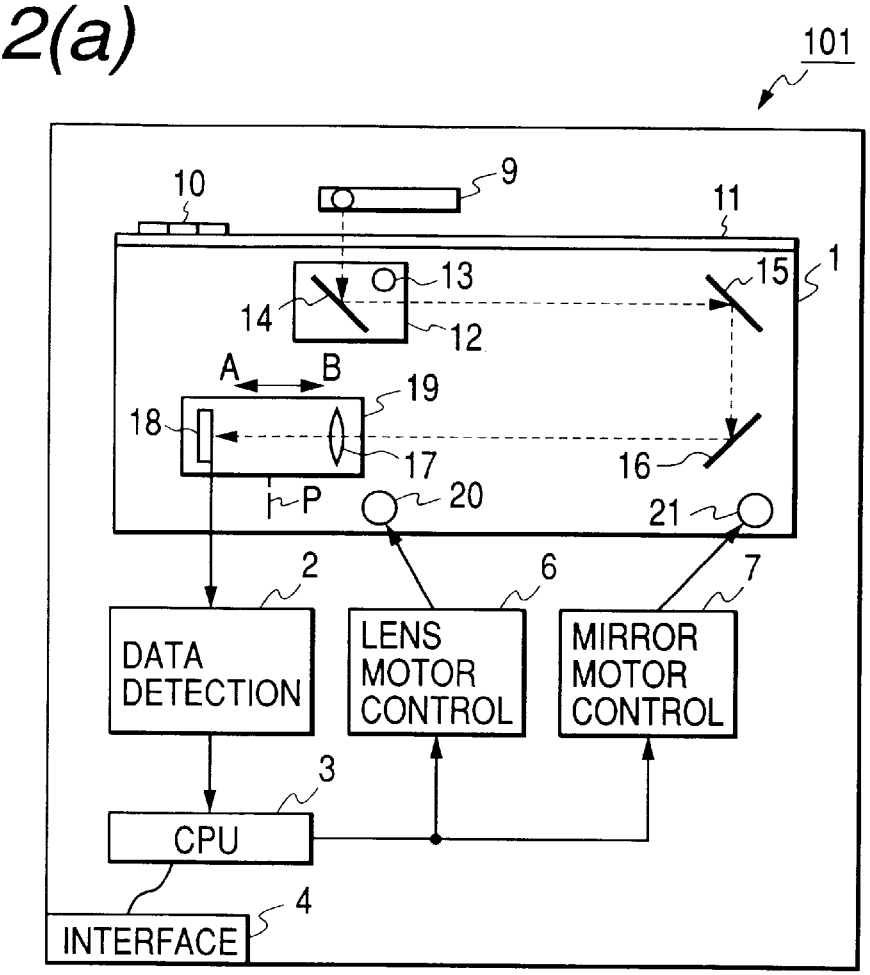
FIGS. 2(a) and 2(b) are views showing another exemplary configuration of the document reader in a mirror movement system according to the present invention.

FIGS. 1 and 2 show exemplary configurations of a document reader in a mirror movement system according to the present invention. FIG. 1(a) shows the case where a reflecting-type document is read, and FIG. 2(a) shows the case where a transmitting-type document is read.

Figure 13:
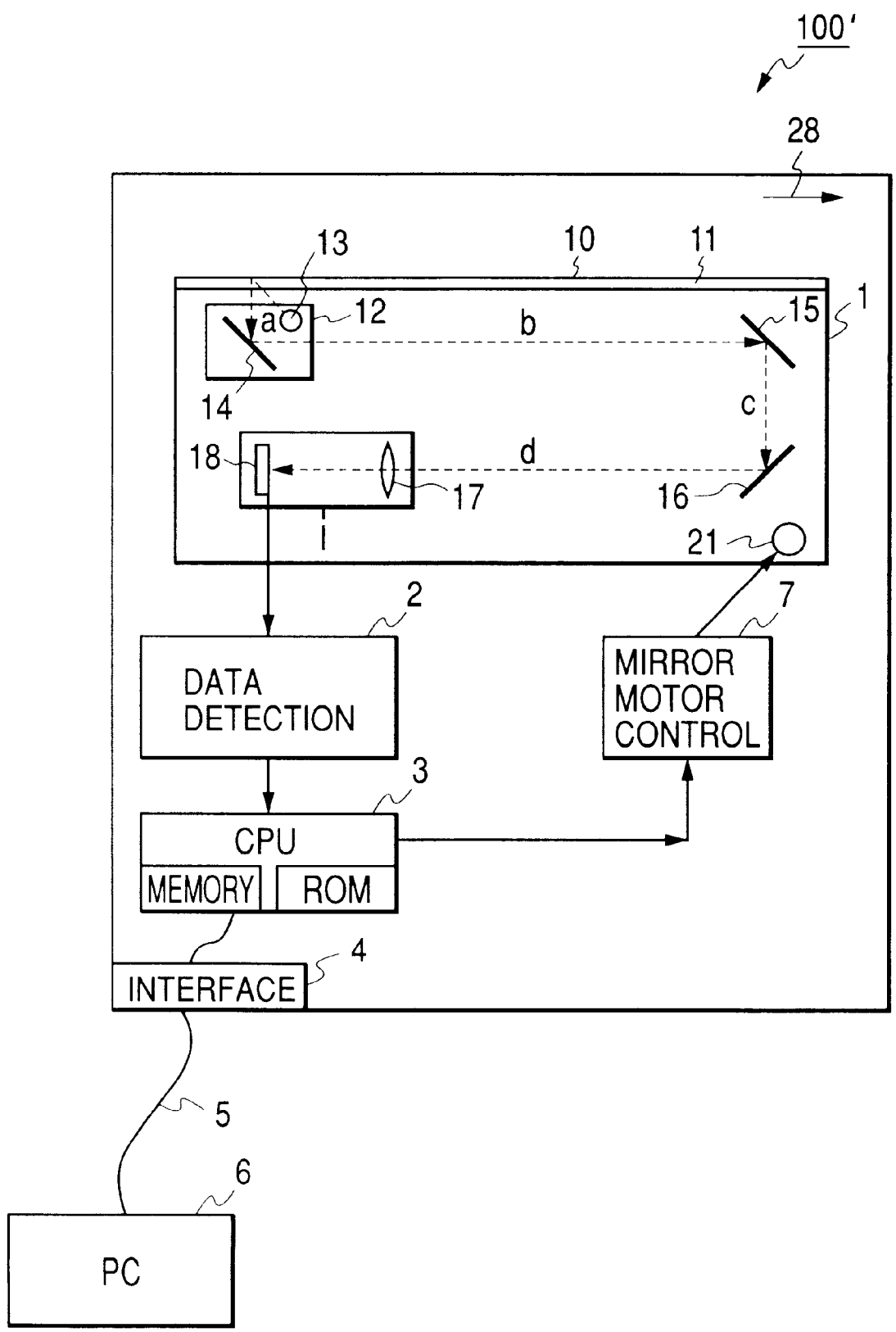
FIG. 13 is a schematic diagram of a conventional document reader in a mirror movement system.

A document reader shown in FIG. 1(a), generally 100 includes a reading unit 1 for optically reading a color or monochromatic document to be electrically converted into multi-value (or binary) data, a data detecting unit 2 for detecting an output data and others from said reading unit 1, a controlling unit 3 for receiving the detected data from the data detecting unit 2 to produce an image data and controlling the movement of a mirror carriage 12 and mirrors 15, 16 arranged in the reading unit 1 and small movement of a lens carriage 19, and an interface 4 for outputting the image data. The image data is supplied to an external image data processing unit 6 (FIG. 13) such as a PC (personal computer) through the interface 4. Incidentally, the controlling unit 3 can be configured by an MPU (microprocessor having a CPU, RAM and ROM).

The reading unit 1 mainly includes a mirror carriage 12 which is a pair of a light source (lamp) 13 and a mirror 14 used to scan the document optically; mirrors 15, 16; and a lens carriage 19 which is an integrated pair of a light-gathering lens 17 and a CCD 18. The reading unit 1 also includes a stepping motor 20 for moving the lens carriage 19 finely in a horizontal direction, and a stepping motor 21 for moving the mirror carriage 12 and mirrors 15, 16. In FIG. 1, the form position (mechanical reference position) is indicated by P.

Where the transmitting-type document is to be read, a light source (lamp) 9 which moves in synchronism with the mirror carriage 12 may be provided in a transmitting-type-document reader, generally 101 as shown in FIG. 2(a). The remaining configuration is the same as the reflecting-type-document reader 100 shown in FIG. 1. A detailed explanation will be given of the reflecting-type-document reader 100 shown in FIG. 1(a).

Figure 2B:
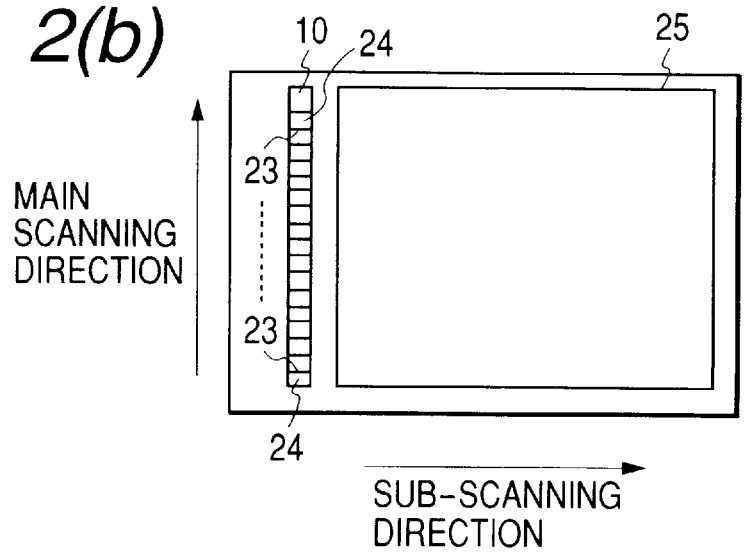

FIG. 1(b) and FIG. 2(b) are views when a focus adjustment reference plate 10 located on the document stand 11 made of glass is viewed. The focus adjustment reference plate 10, as shown in FIGS. 1(b) and 2(b), is a plate (paper, plastic, etc) with black strips 23, 23, . . . and white areas 24, 24, . . . alternately arranged at regular intervals in a longitudinal direction. The focus adjustment reference plate 10, as shown in FIG. 2(b), may be also attached onto the document stand 11 made of glass by e.g. stamping along a main scanning direction in front of a read starting position of the document 25, and is used for focus adjustment for the document reader 100 described later.

The document stand 11 is made of a light transmitting material such as glass above the reading unit 1 in the document reader 100 shown in FIG. 1(a). A reflecting-type document such as an original or photograph, or a transmitting-type document such as a negative film or positive film is to be placed on the document stand 11. Incidentally, the negative film, positive film, etc. normally held in the holder 51, is placed on the document stand 11.

The mirror carriage 12, which is a pair of the light source 13 and mirror 14, reflects, by the mirror 14, the light projected from the light source 13 and reflected by a document so as to be incident on the mirror 15.

In this case, as described later, prior to scanning of the document, the focus adjustment plate is scanned for focus adjustment, and thereafter the document is scanned in a sub-scanning direction (from the head of the document to its tail).

The mirror 15 reflects the incident light from the mirror 14 in a vertical direction so that it is incident on the mirror 16. The mirror 16 further reflects the incident light so that it is incident on the lens 17. The mirrors 15, 16 move in a sub-scanning direction in synchronism with the movement of the mirror carriage 12. Their moving distance is set for ½ of that of the mirror carriage 12 so that the optical path length L is constant. The distance between the mirrors 15 and 16 is constant.

The movement of the mirror carriage 12 and mirrors 15, 16 is carried out by the stepping motor 21 on the basis of a pulse signal which is produced from the mirror motor controlling unit 7 under the control by the controlling unit 3. In this case, in order to vary the moving distance of the mirror carriage 12 and that of the mirrors 15, 16, conversion is made by gears or the like. The mirror carriage 12 and the mirrors 15, 16 may be moved individually by different stepping motors.

The lens carriage 19, which is an integrated pair of the light-gathering lens 17 and CCD 18, is designed to move minutely to and fro in the sub-scanning direction on the basis of a driving signal from the lens motor controlling unit 6 under the controlling unit 3. The minute movement of the lens carriage 19 (which is designed to be about ±6 mm in the sub-scanning direction from the mechanical reference position P in this embodiment) permits the focus adjustment described later. When the light subjected to the focus adjustment to be in focus is incident on the lens 17, the lens 17 focuses the incident light on the elements of the CCD 18. The elements of the CCD 18 converts the light into electric signals (electric charges) to be outputted sequentially.

The data detecting unit 2 A/D (analog/digital) converts the output analog data received from the CCD 18 to digital data and supplies the resultant digital data having a prescribed bit length to the controlling unit 3.

The controlling unit 3 is configured by an MPU consisting of CPU, ROM and RAM, and the ROM stores a program for a focus adjusting means 30 (described later) inclusive of a mirror controlling means for controlling the lens motor controlling unit 6 and mirror motor controlling unit 7. The program is executed by the CPU when the reader 100 is driven. The controlling unit 3 supplies the image data (multi-value data) from the data detecting unit 2 to an external device through the interface 4. The external device includes an image processing device of a computer system such as a personal computer, and a storage device such as CD-ROM. Additionally, where a reference region be set by the external image processing device such as a personal computer, necessary control data such as a parameter will be taken into the controlling unit 3 from the external device through the interface 4.

The lens motor controlling unit 6 sends a driving signal to the stepping motor 20 under the control by the controlling unit 3 so that the lens carriage 19 is moved minutely in the sub-scanning direction. Further, the mirror motor controlling unit 7 sends a driving signal to the stepping motor 21 under the control by the controlling unit 3 so that the mirror carriage 12 and mirrors 15, 16 are moved in the sub-scanning direction at prescribed speeds, respectively.

Figure 3:
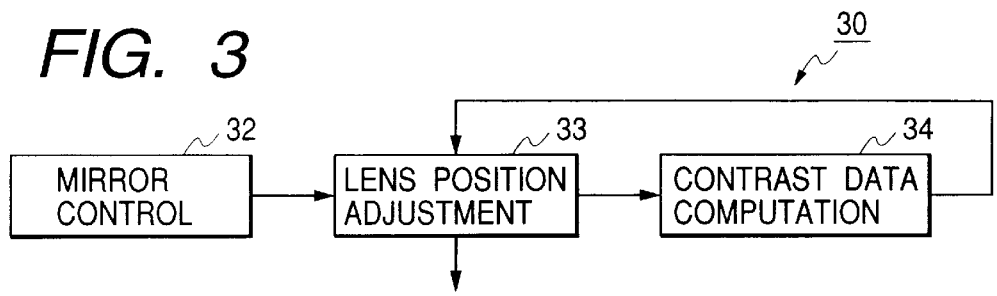
FIG. 3 is a block diagram showing an exemplary configuration of a focus adjusting means stored in a ROM.
Figure 4:
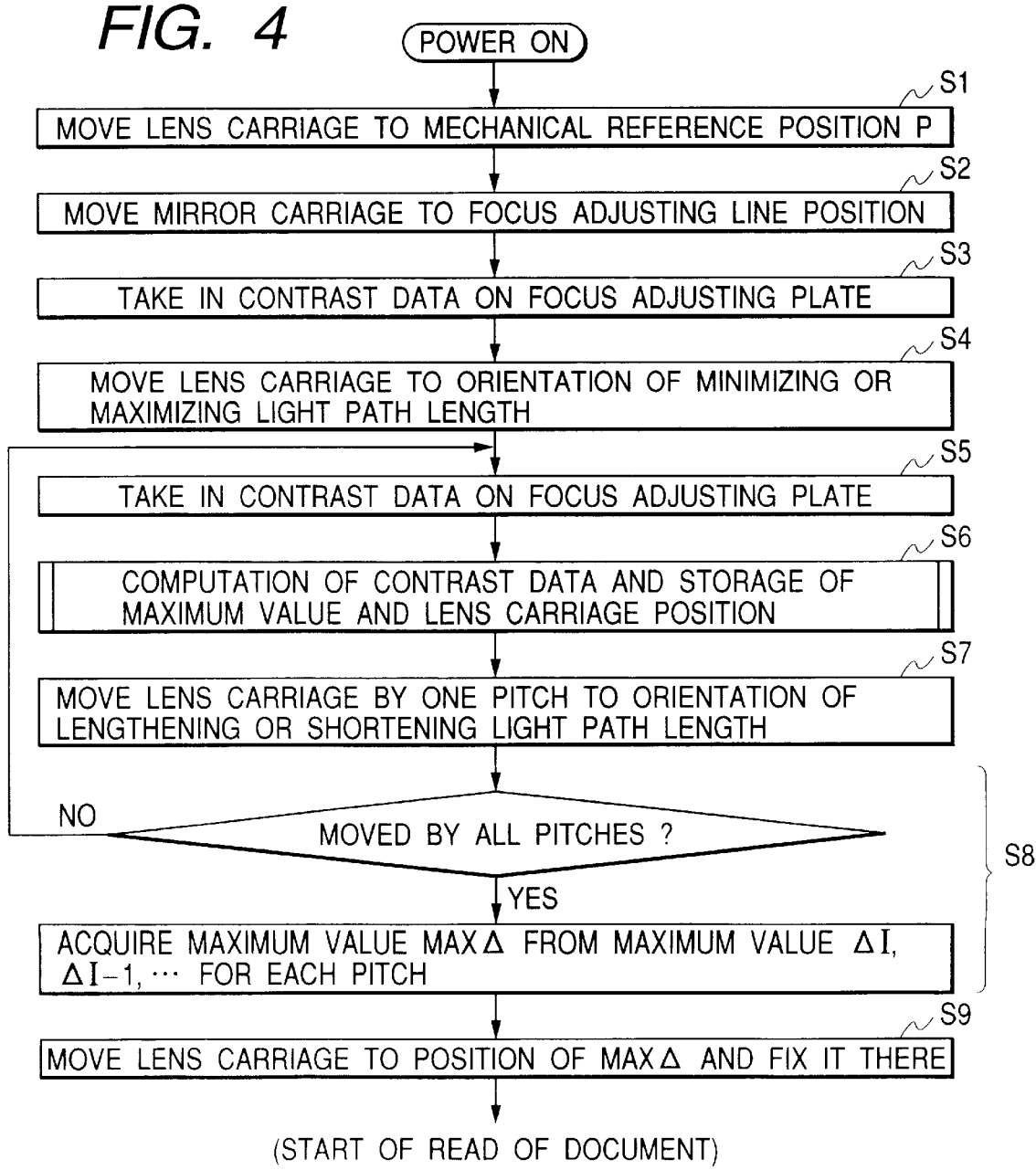
FIG. 4 is a flowchart showing the operation of the document reader shown in FIG. 1.

FIG. 3 is a block diagram showing an exemplary configuration of the focus adjusting means 30 stored in the ROM in the controlling unit 3. The focus adjusting means 30 includes a mirror controlling means 32 for controlling the operation of the mirror carriage 12 and mirrors 15, 16, a lens position adjusting means 33 for controlling the operation of the lens carriage 19 and a contrast data computing means 34. FIG. 4 is a flowchart showing the operation of the document reader 100. An explanation will be mainly given of the operation of the controlling unit 3 where the document is in intimate contact with the document stand 11.

First, when power is turned on, the control unit 3 sends an initial setting value to the lens motor controlling unit 6 on the basis of the lens position adjusting means 33 to drive the stepping motor 20 so that the lens carriage 19 is moved to the mechanical reference position P (FIG. 1(a)) (S1).

The controlling unit 3 sends a control signal to the mirror motor controlling unit 7 on the basis of the mirror controlling means 32 so that the mirror carriage 12 and mirrors 15 16 are moved to focus adjusting line positions (S2).

The controlling unit 3 puts on the lamp 13 on the basis of the mirror controlling means 32 to irradiate the lower face 10 of the focus adjusting plate 10 with light. Thus, the light reflected from the focus adjusting plate 10 is incident on the CCD 18 through the mirrors 14, 15, 16 and lens 17 and is converted into an electric signal. The data thus converted will be taken into the memory of the controlling unit 3 through the data detecting unit (S3).

The controlling unit 3 sends a control signal to the lens motor controlling unit 6 on the basis of the lens position adjusting means 33 so that the lens carriage 19 is moved to a lens position of the limit (+6 mm in this embodiment) in an orientation (B) of minimizing the optical path length (S4).

In the manner similar to step S3, the light read at the above new lens position and reflected from the focus adjusting plate 10 is also converted into an electric signal. The data thus converted will be taken into the memory of the controlling unit 3 through the data detecting unit (S5).

The controlling unit 3 computes the contrast on the basis of the contrast computing means 34 so that the maximum value of the contrast and position of the lens carriage 19 are held (S6).

The controlling unit 3 sends a control signal to the lens motor controlling unit 6 on the basis of the lens position adjusting means 33 so that the lens carriage 19 is moved by one pitch (0.5 mm in this embodiment) in an orientation (A) of lengthening the optical path length (S7).

Steps S5 to S7 are repeated so that the lens carriage 19 is finally moved to a lens position of the limit (12 mm=6 mm+6 mm in this embodiment) in orientation A. A maximum value is selected from the maximum values of contrast computed at the lens positions on the basis of contrast computing means 34 and held in the memory. Thus, the position data of the lens carriage 19 at the maximum contrast can be obtained from the memory (S8).

The control unit 3 sends a control signal to the lens motor controlling unit 6 on the basis of the lens position adjusting means 33 so that the lens carriage 19 is fixed to the lens position with the maximum contrast (S9).

Thus, the optical path length from the document in intimate contact with the document stand 11 to the lens 17 can cancel its variations in fabrication and error generated in transfer. Accordingly, by scanning the document from the read starting position after the lens carriage 19 has been fixed through focus adjustment, the image data in focus can be obtained.

In this embodiment, the reflecting-type-document reader 100 was explained. However, in like manner, focus adjustment can be carried out for the case where the document is in contact with the document stand in the transmitting-type-document reader shown in FIG. 2.

Where the document is not in contact with and is apart from a glass face of the document stand, the focus adjustment can be carried out by the technique described later (see Embodiment 1).

Further, the focus adjusting means can also be configured in such a manner that focus adjustment is carried out on the basis of a reference line or reference region data set by the external device such as a personal computer without providing the above focus adjusting plate on the document reader (see Embodiment 2).

Embodiment 1

Figure 5:
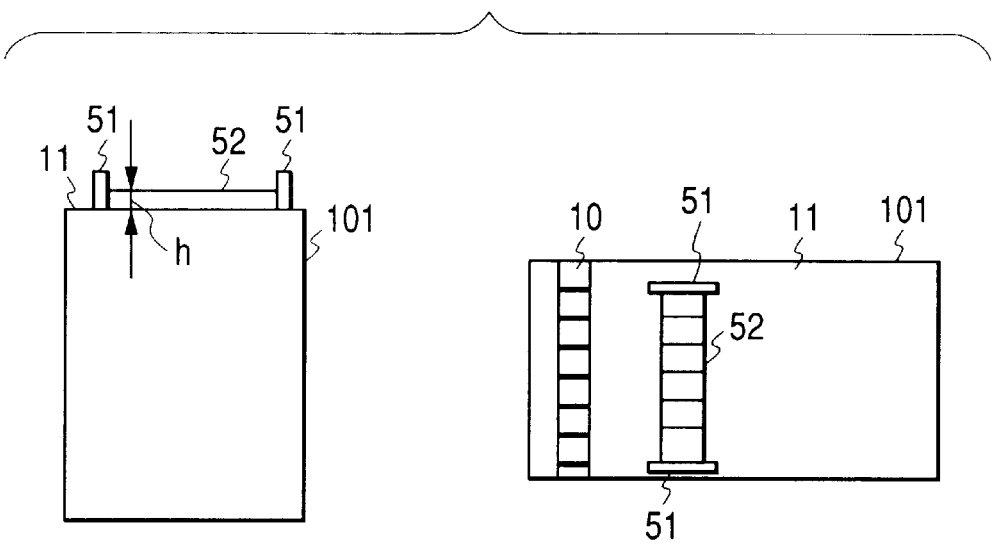
FIG. 5 is a view showing a negative film held in a film holder placed on a document reader.

FIG. 5 shows an embodiment in which a photographic negative film 52 held in a film holder 51 is placed on the document stand 11 of the transmitting-type-document reader 101. FIG. 5(a) is a side view and FIG. 5(b) is a bird's eye view. As seen from FIG. 5(a), a gap h is present between the plane of the film 52 and a glass plane of the document stand 11. Although the gap h differs according to manufacturers of the film holder 51, in this embodiment, h is about 3 mm.

Therefore, if the focus adjustment is carried out with respect to the lower face of the focus adjustment plate 10 (i.e. upper face of the glass plate), the optical path length increases by the gap h, thus resulting in out-of-focus.

Figure 6:
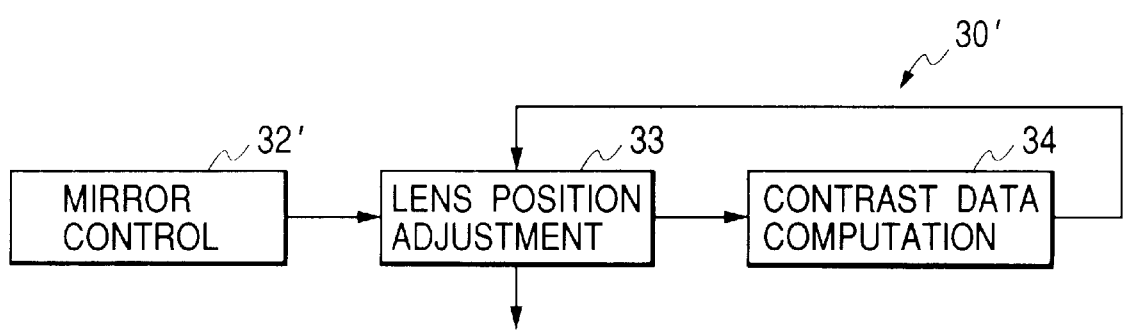
FIG. 6 is a block diagram showing another configuration of the focus adjusting means.

FIG. 6 shows, in block form, a configuration of a focus adjusting means 30' used to read the photographic negative film 52 held by the film holders 51 on the transmitting-type-document reader 101. The focus adjusting means 30' includes a mirror controlling means 32' for controlling the operation of the mirror carriage 12 and mirrors 15, 16, a lens position adjusting means 33 for controlling the operation of the lens carriage 19 and a contrast data computing means 34. In this case, it is desirable that at least one surface of the film holder 51 is made of a transparent material and in a central zone thereof where the film is sandwiched, black stripes for reference similar to those given to the focus adjusting plate of FIG. 1 are given. It is also desirable that a mark indicative of the area where the film holder 51 should be placed is given in the other region than the glass plane on the document stand 11.

Figure 7:
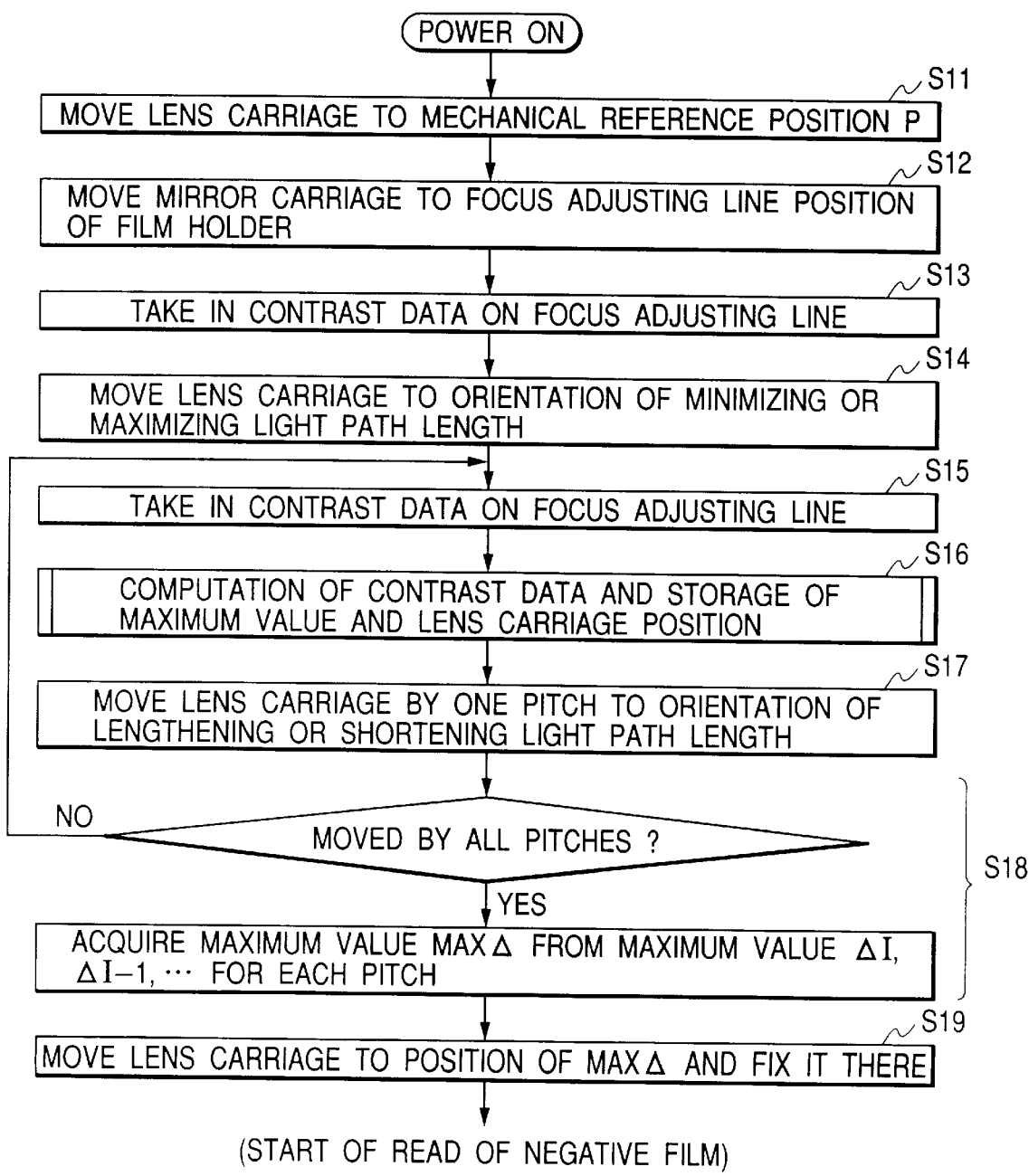
FIG. 7 is a flowchart showing the operation of the document reader shown in FIG. 2.

FIG. 7 is a flowchart showing the focus adjusting operation when the transmitting-type document is read.

In the flowchart of FIG. 7, first, when power is turned on, the control unit 3 sends an initial setting value to the lens motor controlling unit 6 on the basis of the lens position adjusting means 33 to drive the stepping motor 20 so that the lens carriage 19 is moved to the mechanical reference position P (FIG. 2(a)) and aligns a focusing position to the glass plane of the document stand 11 (S11).

The controlling unit 3 sends a control signal to the mirror motor controlling unit 7 on the basis of the mirror controlling means 32' so that the mirror carriage 12, mirrors 15 16 and lamp (light source 9) are moved to focus adjusting line positions of the film holding portion (S12).

The controlling unit 3 puts on the lamp (light source 9) on the basis of the mirror controlling means 32' to irradiate the focus adjustment lines of the film holding portion with light. Thus, the transmitted light incident on the CCD 18 through the mirrors 14, 15, 16 and lens 17 is converted into an electric signal. The data thus converted will be taken into the memory of the controlling unit 3 through the data detecting unit (S13).

The controlling unit 3 sends a control signal to the lens motor controlling unit 6 on the basis of the lens position adjusting means 33 so that the lens carriage 19 is moved to a lens position of the limit (+6 mm in this embodiment) in an orientation (B) of minimizing the optical path length (S14).

In the manner similar to step S13, the light read at the above new lens position and passing through the focus adjusting plate 10 is also converted into an electric signal. The data thus converted will be taken into the memory of the controlling unit 3 through the data detecting unit (S15).

The controlling unit 3 computes the contrast on the basis of the contrast computing means 34 so that the maximum value of the contrast and position of the lens carriage 19 are held (S16).

The controlling unit 3 sends a control signal to the lens motor controlling unit 6 on the basis of the lens position adjusting means 33 so that the lens carriage 19 is moved by one pitch (0.5 mm in this embodiment) in an orientation (A) of lengthening the optical path length (S17).

Steps S15 to S17 are repeated so that the lens carriage 19 is finally moved to a lens position of the limit (12 mm=6 mm+6 mm in this embodiment) in orientation A. A maximum value is selected from the maximum values of contrast computed at the lens positions on the basis of contrast computing means 34 and stored in the memory. Thus, the position data of the lens carriage 19 at the maximum contrast can be obtained from the memory (S18).

The control unit 3 sends a control signal to the lens motor controlling unit 6 on the basis of the lens position adjusting means 33 so that the lens carriage 19 is fixed to the lens position of the maximum contrast (S19).

Thus, the optical path length from the film plane to the lens 17 can cancel its variations in fabrication, error generated in transfer and out-of-focus due to the gap h between the glass plate and film. Accordingly, by scanning the document from the read starting position with the lens carriage 19 focus-adjusted is fixed, the image data in focus can be obtained.

Embodiment 2

This is an embodiment in which without using the focus adjusting plate 10 shown in FIG. 1 or 2, focus adjustment is carried out on the basis of a reference line or reference region data set by the external device such as a personal computer. This embodiment can be applied to read both of a reflecting-type document or a transmitting-type document (inclusive of the film held in the holder or the like). An explanation will be given of its application to reflecting-type -document reader 100 shown in FIG. 1.

Figure 8:
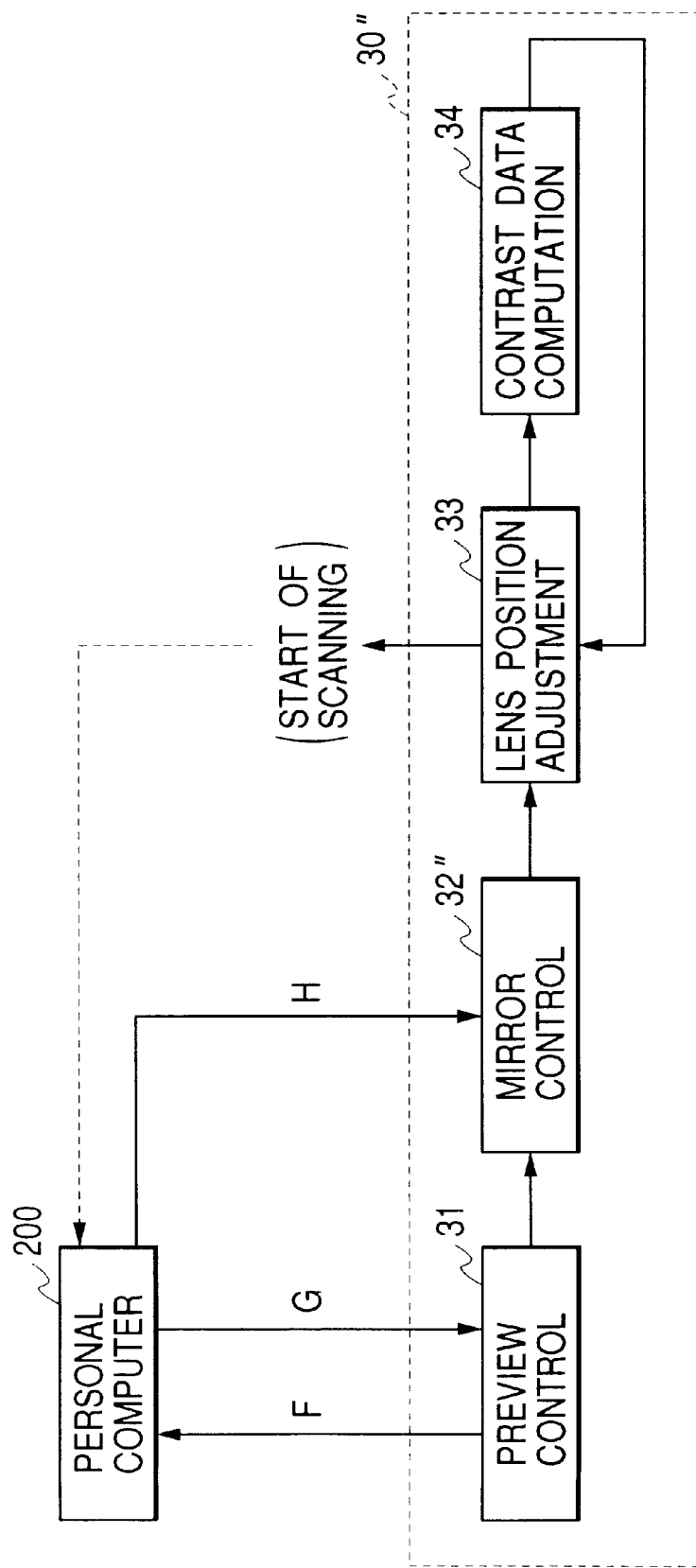
FIG. 8 is a block diagram showing another configuration of the focus adjusting means.

FIG. 8 is a block diagram showing an exemplary configuration of the focus adjusting means 30". The focus adjusting means 30" includes a preview controlling means 31 for scanning a document with a low resolution and outputting preview data thus obtained, a mirror controlling means 32" for controlling the operation of the mirror carriage 12 and mirrors 15, 16, a lens position adjusting means 33 for controlling the operation of the lens carriage 19 and a contrast data computing means 34.

Figure 9:
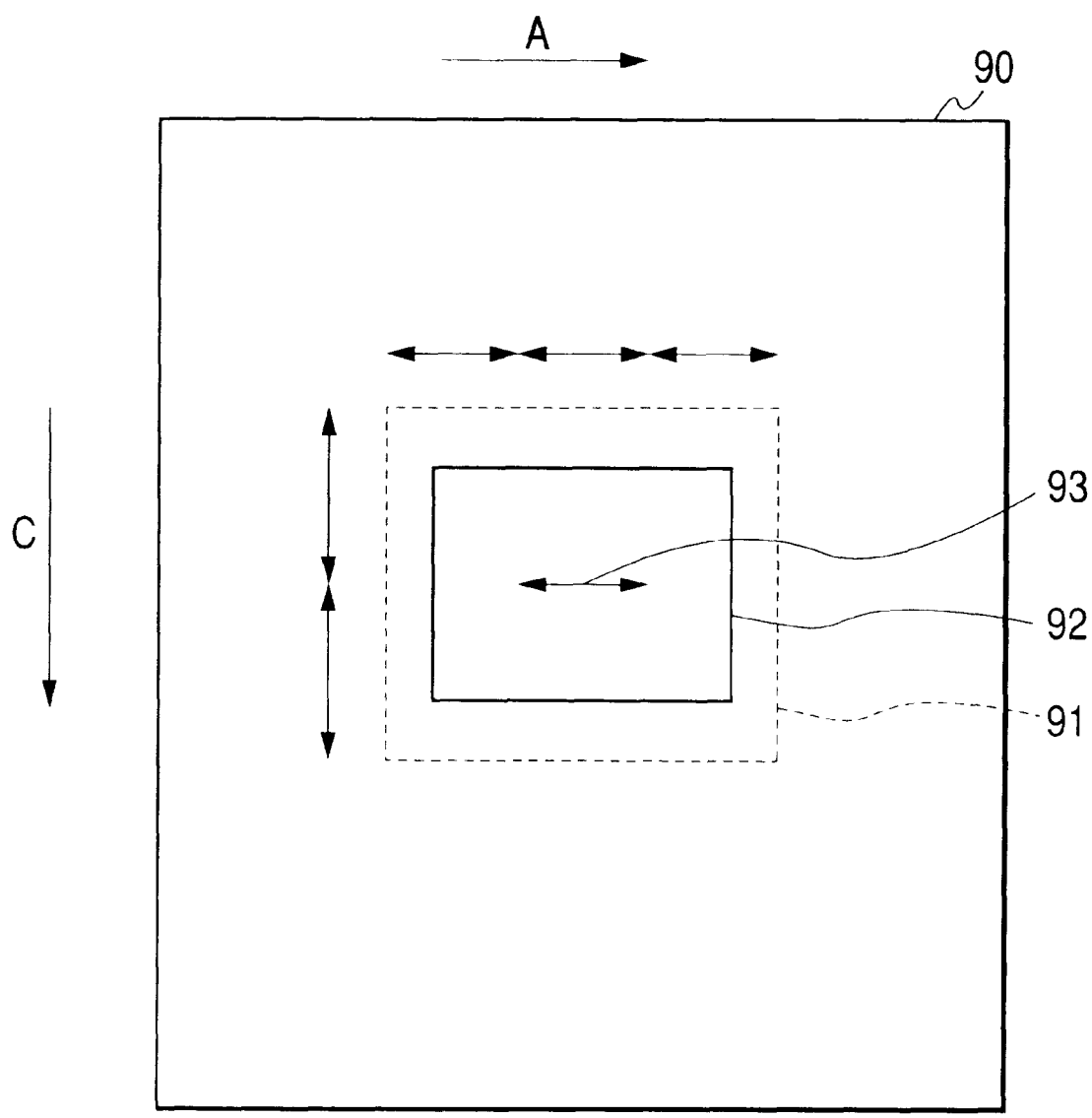
FIG. 9 is a view showing an image with a focus line designated on a document using a personal computer.
Figure 10:
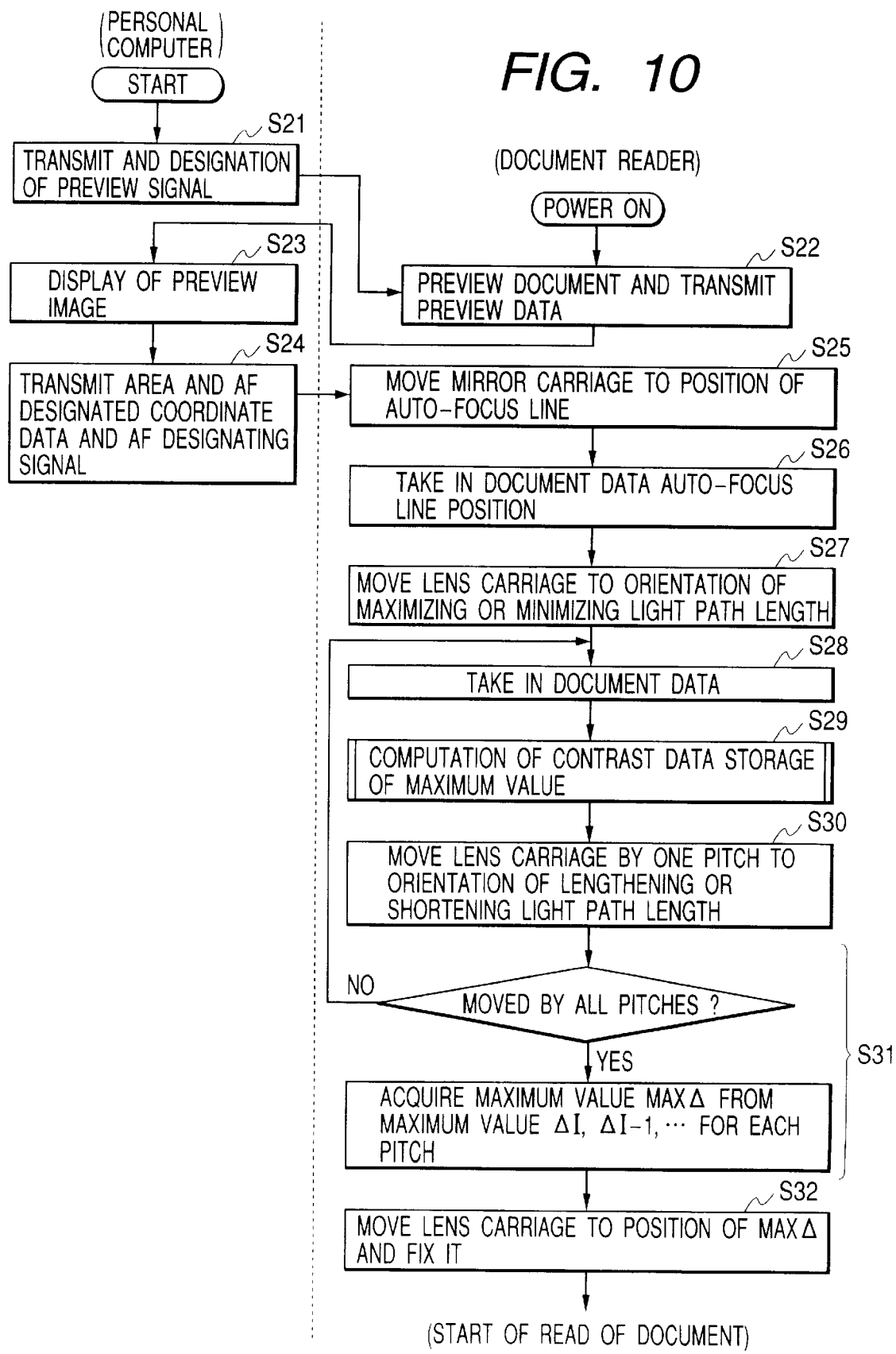
FIG. 10 is a flowchart showing an exemplary operation of the personal computer and document reader.

FIG. 9 shows an exemplary image with focus lines on a document designated using a personal computer. FIG. 10 is a flowchart showing an exemplary operation of a personal computer and a document reader 100 in this case.

In FIG. 10, first, a user operates a personal computer 200 so that a preview command signal F is transferred to the document reader 100 (S21).

When the document reader 100 receives the preview command signal F through the interface 4, the control unit 3 sends a control signal to the mirror motor controlling unit 7 on the basis of the preview means 31 so that the mirror carriage 12 and mirrors 15, 16 are moved from the head line position of the document stand 11 to the final line position so as to scan the entire face of the document stand 11 with a low resolution. The image data with the low resolution taken from the document on the document stand 11 are transferred to the personal computer 200 through the interface 4 as preview data (S22).

The personal computer 200 processes the preview data received from the document reader 100 so that a preview image (entire image of the document) 91 is displayed on a screen 90 (FIG. 9) (S23).

When the user designates a desired position (desired area) on the preview image 91 by the operation of a mouse and further designates auto-focus (AF), the personal computer 200 determines a line at a specific position (e.g. vertical ½ and horizontal ⅓) as an auto-focus line 93 within the area designated by the user, and transfers the corresponding coordinate data and auto-focus designating signal G to the document reader 100 (S24).

When the document reader 100 receives the auto-focus designating signal G and the coordinate data of the auto-focus line 93 through the interface 4, the control unit 3 sends a control signal to the mirror motor controlling unit 7 on the basis of the mirror controlling means 32" so that the mirror carriage 12 and mirrors 15, 16 are moved to the auto-focus line 93 corresponding to the coordinated data (S25).

The controlling unit 3 puts on the lamp (light source 13) to irradiate the auto-focus line with light. Thus, the light incident on the CCD 18 through the mirrors 14, 15, 16 and lens 17 is converted into an electric signal. The data thus converted will be taken into the memory of the controlling unit 3 through the data detecting unit 2 (S26).

The controlling unit 3 sends a control signal to the lens motor controlling unit 6 on the basis of the lens position adjusting means 33 so that the lens carriage 19 is moved to a lens position of the limit (+6 mm in this embodiment) in an orientation (B) of minimizing the optical path length (S27).

In the manner similar to step S26, the light read at the above new lens position and reflected from the document 91 is also converted into an electric signal. The data thus converted will be taken into the memory of the controlling unit 3 through the data detecting unit (S28).

The controlling unit 3 computes the contrast on the basis of the contrast computing means 34 so that the maximum value of the contrast and position of the lens carriage 19 are held (S29).

The controlling unit 3 sends a control signal to the lens motor controlling unit 6 on the basis of the lens position adjusting means 33 so that the lens carriage 19 is moved by one pitch (0.5 mm in this embodiment) in an orientation (A) of lengthening the optical path length (S30).

Steps S28 to S30 are repeated so that the lens carriage 19 is finally moved to a lens position of the limit (12 mm=6 mm+6 mm in this embodiment) in orientation A. A maximum value is selected from the maximum values of contrast computed at the lens positions on the basis of contrast computing means 34 and stored in the memory. Thus, the position data of the lens carriage 19 at the maximum contrast can be obtained from the memory (S31).

The control unit 3 sends a control signal to the lens motor controlling unit 6 on the basis of the lens position adjusting means 33 so that the lens carriage 19 is fixed to the lens position of the maximum contrast (S32).

Thus, the optical path length from the document to the lens 17 can cancel its variations in fabrication and error generated in transfer. Accordingly, by scanning the document from the read starting position with the lens carriage 19 focus-adjusted being fixed, the image data in focus can be obtained.

Embodiment 3

Also where the negative film held in the film holder is scanned, focus adjustment can be carried out in the steps similar to those in the second embodiment. In this case, step S21-1 is given between the above steps S21 and S22.

Specifically, the personal computer 200 inputs the height h of a film plane directly or inputs the type of the film holder (e.g. labelled A type or B type) to compute the height h and transfers the height thus acquired to the document reader 101 (FIG. 2). Now assuming that h=3 mm, the control unit 3 sends a control signal on the basis of the lens position adjusting means 33 so that the lens carriage 19 is moved in an orientation B of shortening the optical path length by 3 mm (S21-1).

Thus, the optical path length from the film plane to the lens 17 can cancel its variations in fabrication, error generated in transfer and out-of-focus due to the gap h between the glass plate and film. Accordingly, by scanning the document from the read starting position with the lens carriage 19 focus-adjusted is fixed, the image data in focus can be obtained.

Embodiment 4

Figure 11:
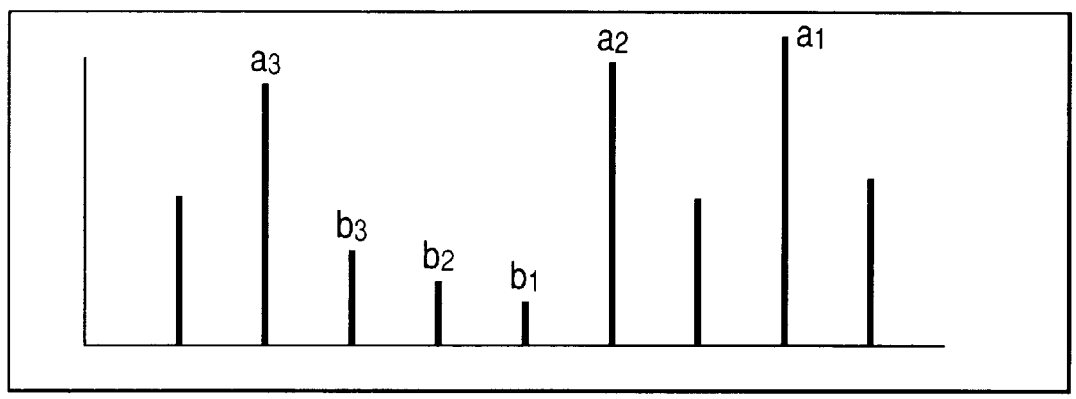
FIG. 11 is a view showing an embodiment of a contrast computing means.

FIG. 11 is a graph for explaining an embodiment of the contrast computing means 34. In this technique, first, from all the data relative to a certain line obtained by reading the focus line at a certain lens position i, n number of larger data (values) a1, a2, ... an and n number of smaller data (values) b1, b2, ... bn are acquired. In this case, remove the influence by abnormal data such as noise, these data are subjected to the following limiter (filter).

An average maximum value $a\Delta i$ ($a\Delta i=(a1+a2+ \ldots an)/n$) and an average minimum value $b\Delta i$ ($b\Delta i=(b1+b2+ \ldots +bn)/n$) are acquired. A difference $a\Delta i-b\Delta i-\Delta i=\Delta i$ between the average maximum value and average minimum value is taken as a maximum contrast $\Delta i$ at the lens position. If $\Delta i \geq \rho$ ($\rho$: limiter value), the lens position i and contrast $\Delta i$ are stored in the memory. If $\Delta i<\rho$, under the decision that the data may be abnormal to inhibit detection, the lens position i and contrast $\Delta i$ are not adopted. FIG. 11 shows an example when n=3.

Upon completion of storage of the lens positions i and contrasts $\Delta i$ for all the pitches, the contrasts $\Delta i$ are read from the memory to acquire a contrast maximum value Max Δi. The lens position i corresponding to the contrast maximum value Max Δi is determined as a position of the lens carriage focus-adjusted.

Embodiment 5

Figure 12:
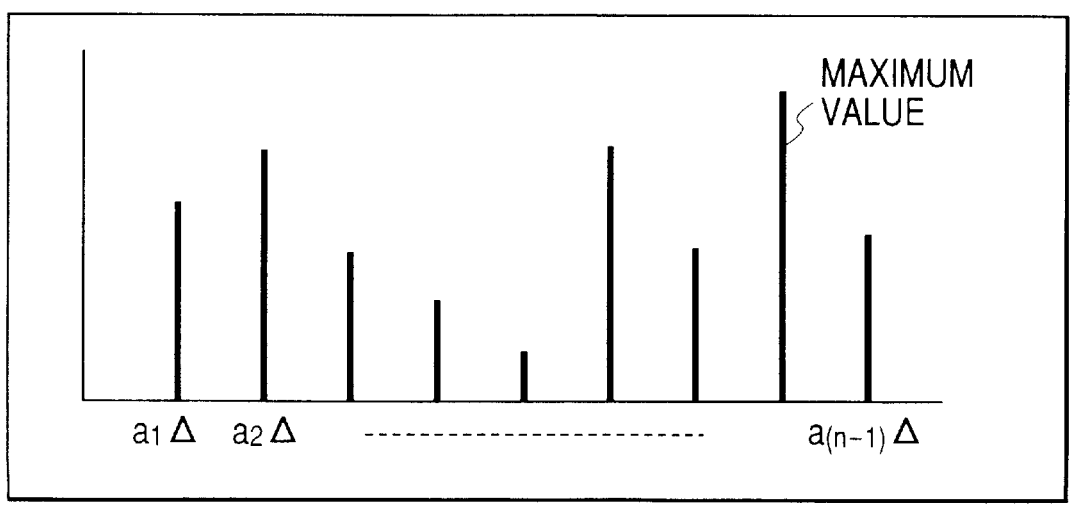
FIG. 12 is a view showing another embodiment of a contrast computing means.

FIG. 12 is a graph for explaining another embodiment of the contrast computing means 34.

In this technique, for all the data relative to a certain line obtained by reading the focus line at a certain lens position k, the absolute value of the difference between adjacent values $|a1-a2|=a1\Delta k$, $|a2-a3|=a2\Delta k$, ... $|a(n-1)-an|=a(n-1)\Delta k$. In the example of FIG. 12, $aj\Delta k$ is maximum. Therefore, the maximum contrast at the lens position k is taken as $aj\Delta k$. The lens position k and contrast $aj\Delta k$ are stored in the memory.

Upon completion of storage of the lens positions k and contrasts $aj\Delta k$ for all the pitches, the contrasts $aj\Delta k$ are read from the memory to acquire a contrast maximum value. The lens position k corresponding to the contrast maximum value is determined as a position of the lens carriage focus-adjusted.

Hitherto, several embodiments of the present invention have been explained. However, the present invention should not be limited to the above embodiments, and can be realized in various modifications. For example, the movement of the lens carriage has been carried out for every one pitch, but may be done for every prescribed number of pitches such as every two or three pitches.

In accordance with the document reader and its focus adjusting method according to the present invention, it is needless to say that the image data in focus can be obtained. However, by making out-of-focus intentionally, the image data with moire removed can be obtained.

What is claimed is:

1. A document reader comprising:

a light-gathering lens for gathering light from a document and an optical sensor for converting light from the light-gathering lens into an electric signal;

focus adjusting means having (1) optical path length adjusting means for adjusting the optical-path length between said document and said light-gathering lens, and (2) mirror controlling means for moving a mirror provided along the optical path during a scanning operation; and a controller for computing an average maximum value and an average minimum value of a luminance signal of each of pixels which are read by said optical sensor and issuing a command to said optical path length adjusting means so that a difference between said average maximum value and said average minimum value is a maximum.

2. A document reader comprising:

a light-gathering lens for gathering light from a document and an optical sensor for converting light from the light-gathering lens into an electric signal;

focus adjusting means having (1) optical path length adjusting means for adjusting the optical-path length between said document and said light-gathering lens, and (2) mirror controlling means for moving a mirror provided along the optical path during a scanning operation; and a controller for computing a difference between luminance signals at adjacent reading positions read by said optical sensor and issuing a command to said optical path length adjusting means so that the absolute value of the difference is a maximum.

3. A document reader according to claim 1 or 2, further comprising:

a focus adjusting plate attached to a prescribed position of a document stand, wherein said controller issues a command to said optical path length adjusting means on the basis of a luminance signal of an image for focus adjustment on said focus adjusting plate which is read by said optical sensor.

4. A focus adjusting method for a document reader which gathers light from a document by a light-gathering lens and converts light from said light-gathering lens into an electric signal, comprising the steps of:

(a) adjusting an optical path length between said light-gathering lens and said document;

(b) using said optical sensor, reading luminance of each of pixels on said document and converting it into an electric signal;

(c) computing an average maximum value and an average minimum value of said electric signal of each said pixel in said step (b);

(d) repeating said steps (a), (b) and (c) for a plurality of optical path lengths;

(e) determining an optical path length when a difference between said average maximum value and said average minimum value is a maximum;

(f) adjusting the optical path length so that it is the optical path length determined in said step (e):and (g) moving a mirror provided along the optical path during a scanning operation.

5. A focus adjusting method for a document reader which gathers light from a document by a light-gathering lens and converts light from said light-gathering lens into an electric signal, comprising the steps of:

(a) adjusting an optical path length between said light-gathering lens and said document;

(b) using said optical sensor, reading luminance at each of a plurality of reading positions on said document and converting them into electric signals;

(c) computing a difference between magnitudes of said electric signals at adjacent reading positions in said step (b);

(d) repeating said steps (a), (b) and (c) with a plurality of optical path lengths;

(e) determining an optical path length when the difference between magnitudes of said electric signals at said adjacent reading positions is a maximum;

(f) adjusting the optical length so that it is the optical path length determined is said step (e): and (g) moving a mirror provided along the optical path during a scanning operation.

6. A focus adjusting method according to claim 4 or 5, wherein said document is a focus adjusting plate attached to a prescribed position of a document stand, and said focus adjusting plate includes an image for focus adjustment.

* * * * *